(12) United States Patent
Nieminen et al.

(10) Patent No.: US 10,271,280 B2
(45) Date of Patent: Apr. 23, 2019

(54) TECHNIQUES ALLOWING ACTIVATION AND DEACTIVATION OF NODES IN A NETWORK

(71) Applicant: Nokia Technologies Oy, Espoo (FI)

(72) Inventors: Jari Armas Nieminen, Espoo (FI); Osman Nuri Can Yilmaz, Espoo (FI)

(73) Assignee: Nokia Technologies Oy, Espoo (FI)

( * ) Notice: Subject to any disclaimer, the term of this patent is extended or adjusted under 35 U.S.C. 154(b) by 124 days.

(21) Appl. No.: 15/307,598

(22) PCT Filed: May 8, 2014

(86) PCT No.: PCT/IB2014/061301
§ 371 (c)(1),
(2) Date: Oct. 28, 2016

(87) PCT Pub. No.: WO2015/170144
PCT Pub. Date: Nov. 12, 2015

(65) Prior Publication Data
US 2017/0055216 A1    Feb. 23, 2017

(51) Int. Cl.
*H04W 52/02* (2009.01)
*H04W 4/029* (2018.01)
(Continued)

(52) U.S. Cl.
CPC ....... *H04W 52/0229* (2013.01); *H04W 4/029* (2018.02); *H04W 4/70* (2018.02);
(Continued)

(58) Field of Classification Search
CPC ... H04W 52/0229; H04W 4/70; H04W 4/029; H04W 76/048; H04W 4/028;
(Continued)

(56) References Cited

U.S. PATENT DOCUMENTS

2010/0165835 A1* 7/2010 Hsu ................. H04W 76/18
 370/225
2013/0150108 A1  6/2013 Yang et al. .............. 455/509

FOREIGN PATENT DOCUMENTS

| EP | 2403186 A1 | 1/2012 |
| WO | 2012064178 A1 | 5/2012 |
| WO | 20130093670 A1 | 6/2013 |

OTHER PUBLICATIONS

International Search Report and Written Opinion received for corresponding Patent Cooperation Treaty Application No. PCT/IB2014/061301, dated Mar. 10, 2015, 11 pages.

(Continued)

*Primary Examiner* — Ali Neyzari
(74) *Attorney, Agent, or Firm* — Harrington & Smith (57) ABSTRACT

At a source node in a wireless network, it is determined that target node(s) should be one of activated or deactivated. Message(s) are sent from the source node toward a base station providing wireless access for nodes to the wireless network. The message(s) include an identification of the target node(s) and are configured to indicate that the at least one target node should be one of activated or deactivated. A base station receives the message(s) and sends a message toward each of the target node(s) indicating that the target node(s) should be the one of activated or deactivated. The source and target nodes may be sensor nodes in a wireless sensor network. Methods, apparatus, computer products, and a computer program are disclosed.

20 Claims, 5 Drawing Sheets

(51) Int. Cl.
*H04W 4/70* (2018.01)
*H04W 76/28* (2018.01)

(52) U.S. Cl.
CPC .............. *H04W 76/28* (2018.02); *Y02D 70/00* (2018.01); *Y02D 70/1262* (2018.01); *Y02D 70/144* (2018.01); *Y02D 70/21* (2018.01); *Y02D 70/24* (2018.01); *Y02D 70/25* (2018.01); *Y02D 70/26* (2018.01)

(58) Field of Classification Search
CPC ....... H04W 4/005; H04W 40/02; H04W 4/06; H04W 72/005; Y02D 70/24; Y02D 70/00; Y02D 70/1262; Y02D 70/144; Y02D 70/25; H04L 5/0094
USPC .................... 370/225, 331; 455/454; 340/3.1
See application file for complete search history.

(56) References Cited

OTHER PUBLICATIONS

IEEE Std 802.15.4™—2011, "IEEE Standard for Local and metropolitan area networks—Part 15.4: Low-Rate Wireless Personal Area Networks (LR-WPANs)", IEEE, Sep. 5, 2011, 314 pgs.

Hong, Hyungseop, et al., "A Continuous Object Tracking Protocol Suitable for Practical Wireless Sensor Networks", 2013 IEEE Wireless Communications and Networking Conference, 2013, 6 pgs.

Bhatti, Sania, et al., "Survey of Target Tracking Protocols using Wireless Sensor Network", 2009 Fifth International Conference on Wireless and Mobile Communications, 2009, 6 pgs.

Xu, Yingqi, et al., "Prediction-based Strategies for Energy Saving in Object Tracking Sensor Networks", 2004 IEEE International Conference on Mobile Data Management, 2004, 12 pgs.

\* cited by examiner

TECHNIQUES ALLOWING ACTIVATION AND DEACTIVATION OF NODES IN A NETWORK

RELATED APPLICATION

This application was originally filed as Patent Cooperation Treaty Application No. PCT/IB2014/061301 filed May 8, 2014.

TECHNICAL FIELD

This invention relates generally to wireless communications and, more specifically, to activating and deactivating nodes in a wireless communication network.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

A wireless sensor network (WSN) is a network of spatially distributed, typically autonomous sensors (commonly called "nodes", although a node might be connected to multiple sensors) to monitor physical or environmental conditions, such as temperature, sound, pressure, and the like. The nodes pass their data through the network generally to a main location, i.e., to a sink node. Such networks are used in many industrial and consumer applications, such as industrial process monitoring and control, machine health monitoring, health care monitoring, and area monitoring.

WSNs may occur in cellular systems, which means that the nodes are under control (at least in part) of base stations in the cellular systems. Thus, information to be transmitted or received between nodes may have to go through or be controlled by a base station. Such systems could be improved in certain situations, as described in more detail below.

SUMMARY

This section contains examples of possible implementations and is not meant to be limiting.

In an exemplary embodiment, a method includes determining at a source node in a wireless network that at least one target node should be one of activated or deactivated. The method includes sending one or more messages from the source node toward a base station providing wireless access for nodes to the wireless network, wherein the one or more messages comprise an identification of the at least one target node and are configured to indicate that the at least one target node should be one of activated or deactivated. Additionally, the source and target nodes may be sensor nodes in a wireless sensor network.

An exemplary apparatus includes one or more processors and one or more memories including computer program code. The one or more memories and the computer program code are configured to, with the one or more processors, cause the apparatus to perform at least the following: determining at a source node in a wireless network that at least one target node should be one of activated or deactivated; and sending one or more messages from the source node toward a base station providing wireless access for nodes to the wireless network, wherein the one or more messages comprise an identification of the at least one target node and are configured to indicate that the at least one target node should be one of activated or deactivated.

An apparatus comprises: means for determining at a source node in a wireless network that at least one target node should be one of activated or deactivated; and means for sending one or more messages from the source node toward a base station providing wireless access for nodes to the wireless network, wherein the one or more messages comprise an identification of the at least one target node and are configured to indicate that the at least one target node should be one of activated or deactivated.

An additional exemplary embodiment includes a computer program, comprising code for determining at a source node in a wireless network that at least one target node should be one of activated or deactivated; and code for sending one or more messages from the source node toward a base station providing wireless access for nodes to the wireless network, wherein the one or more messages comprise an identification of the at least one target node and are configured to indicate that the at least one target node should be one of activated or deactivated; when the computer program is run on a processor. The computer program according to this paragraph, wherein the computer program is a computer program product comprising a computer-readable medium bearing computer program code embodied therein for use with a computer.

An exemplary computer program product includes a computer-readable storage medium bearing computer program code embodied therein for use with a computer. The computer program code includes: code for determining at a source node in a wireless network that at least one target node should be one of activated or deactivated; and code for sending one or more messages from the source node toward a base station providing wireless access for nodes to the wireless network, wherein the one or more messages comprise an identification of the at least one target node and are configured to indicate that the at least one target node should be one of activated or deactivated.

Another exemplary method includes receiving at a base station one or more messages from a source node, wherein the base station provides wireless access for nodes to a wireless network. The one or more messages comprise an identification of at least one target node and are configured to indicate that the at least one target node should be one of activated or deactivated. The method includes sending a message toward each of the at least one target nodes indicating that the target node should be the one of activated or deactivated. The source and target nodes may be sensor nodes in a wireless sensor network.

An exemplary apparatus includes one or more processors and one or more memories including computer program code. The one or more memories and the computer program code are configured to, with the one or more processors, cause the apparatus to perform at least the following: receiving at a base station one or more messages from a source node, wherein the base station provides wireless access for nodes to a wireless network, wherein the one or more messages comprise an identification of at least one target node and are configured to indicate that the at least one target node should be one of activated or deactivated; and sending a message toward each of the at least one target nodes indicating that the target node should be the one of activated or deactivated.

An exemplary apparatus comprises: means for receiving at a base station one or more messages from a source node, wherein the base station provides wireless access for nodes to a wireless network, wherein the one or more messages comprise an identification of at least one target node and are configured to indicate that the at least one target node should be one of activated or deactivated; and means for sending a message toward each of the at least one target nodes indicating that the target node should be the one of activated or deactivated.

An exemplary computer program product includes a computer-readable storage medium bearing computer program code embodied therein for use with a computer. The computer program code includes: code for receiving at a base station one or more messages from a source node, wherein the base station provides wireless access for nodes to a wireless network, wherein the one or more messages comprise an identification of at least one target node and are configured to indicate that the at least one target node should be one of activated or deactivated; and code for sending a message toward each of the at least one target nodes indicating that the target node should be the one of activated or deactivated.

An additional exemplary embodiment includes a computer program, comprising code for receiving at a base station one or more messages from a source node, wherein the base station provides wireless access for nodes to a wireless network, wherein the one or more messages comprise an identification of at least one target node and are configured to indicate that the at least one target node should be one of activated or deactivated; and code for sending a message toward each of the at least one target nodes indicating that the target node should be the one of activated or deactivated; when the computer program is run on a processor. The computer program according to this paragraph, wherein the computer program is a computer program product comprising a computer-readable medium bearing computer program code embodied therein for use with a computer.

DETAILED DESCRIPTION OF THE DRAWINGS

Figure 1:
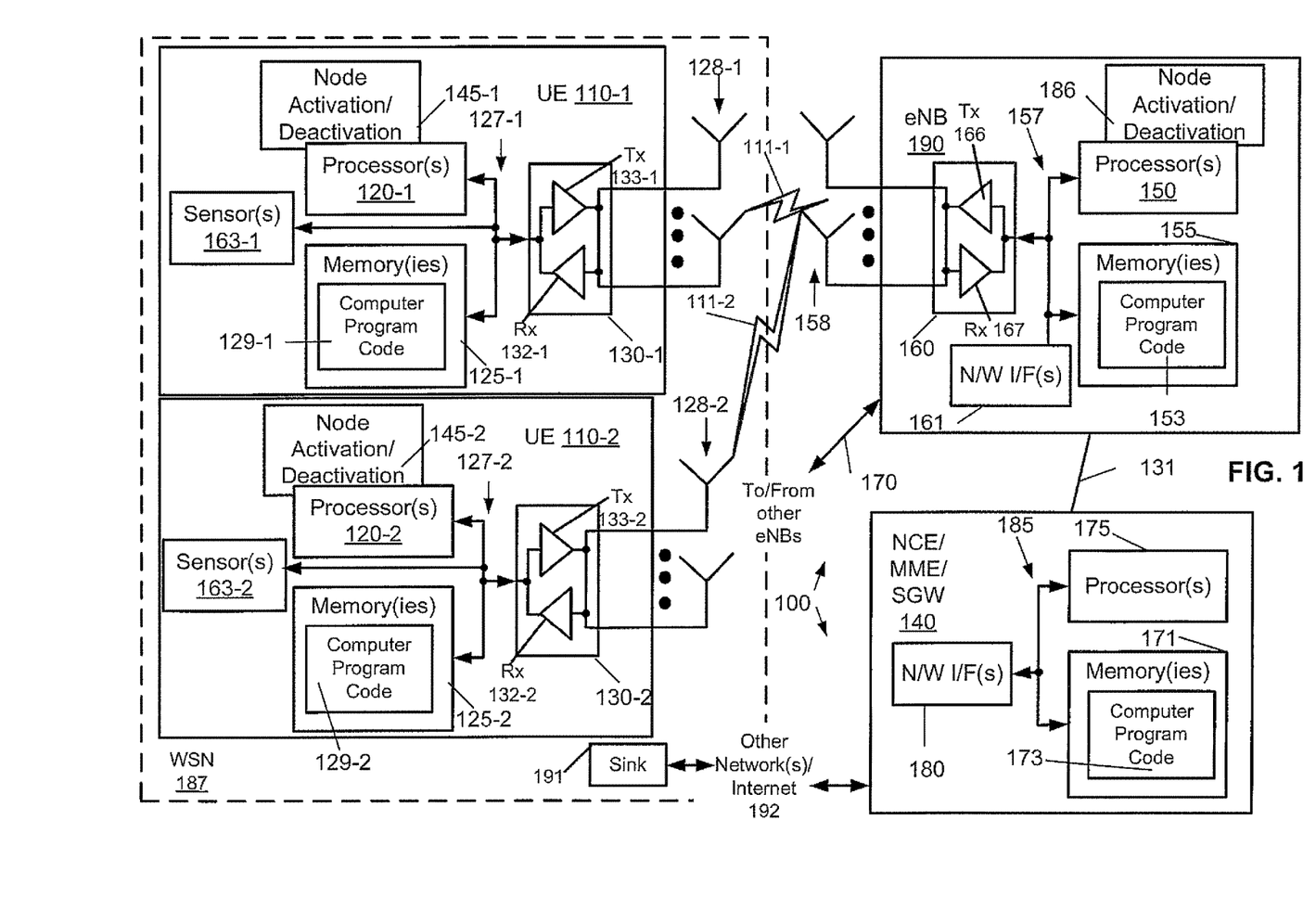
FIG. 1 illustrates an exemplary system suitable for practicing exemplary embodiments herein.

Before proceeding with additional description of possible problems with conventional techniques and description of proactive radio resource management, reference is made to FIG. 1, which shows a block diagram of an exemplary system in which the exemplary embodiments may be practiced. In FIG. 1, user equipment (UEs) 110-1 and 110-2 are in wireless communication with a network 100 via corresponding wireless links 111-1 and 111-2. It is assumed that the UEs 110-1 and 110-2 are similar and therefore only the internal elements in one of the UEs will be discussed herein. A single UE will be referred to as UE 110-1, UE 110-2, or UE 110. Multiple user equipment are referred to as UEs. In an example, the user equipment 110 includes one or more processors 120, one or more memories 125, one or more sensors 163, and one or more transceivers 130 (each comprising a receiver, Rx, 132, and a transmitter, Tx, 133) interconnected through one or more buses 127. The one or more transceivers 130 are connected to one or more antennas 128. The one or more memories 125 include computer program code 129. The one or more sensors 163 may be any sensor used for sensor networks, such as motion, acoustic, vibration sensors, and video surveillance equipment.

The UEs 110 in this example are part of a wireless sensor network (WSN). In this example, the UE 110 has a node activation/deactivation module 145, which causes the UE 110 to perform some or all of the techniques described herein. The node activation/deactivation module 145 may be implemented (in part or completely) as computer program code 129 in the one or more memories 125, such that the one or more memories 125 and the computer program code 129 are configured, with the one or more processors 120, to cause the UE 110 to perform one or more of the techniques described herein. Furthermore, the node activation/deactivation module 145 may be implemented (in part or completely) in hardware, such as in a programmable logic device like a field programmable gate array, an integrated circuit, and the like. Additionally, the line between what is hardware and what is software (implemented by hardware such as a processor) has blurred. A field programmable gate array, for instance, is a hardware element that can be configured and potentially reconfigured using a memory (typically called "firmware"), commonly programmed via a hardware description language, to perform different logic functions. A hardware description language (HDL) is a specialized computer language used to program the structure, design and operation of electronic circuits, and thus is potentially akin to "software". Regardless, the node activation/deactivation module 145 may be implemented through some combination of hardware or software implemented via hardware, if desired.

The eNB 190, which is a base station providing wireless access by the UEs 110 to the network 100, includes one or more processors 150, one or more memories 155, one or more network interfaces (N/W I/F(s)) 161, and one or more transceivers 160 (each comprising a receiver, Rx, 167 and a transmitter, Tx, 166) interconnected through one or more buses 157. The one or more transceivers 160 are connected to one or more antennas 158. The one or more memories 155 include computer program code 153. In this example, the eNB 190 has a node activation/deactivation module 186, which causes the eNB 190 to perform some or all of the techniques described herein. The node activation/deactivation module 186 may be implemented (in part or completely) as computer program code 153 in the one or more memories 155, such that the one or more memories 155 and the computer program code 153 are configured, with the one or more processors 150, to cause the eNB 190 to perform one or more of the techniques described herein. Furthermore, the node activation/deactivation module 186 may be implemented (in part or completely) in hardware, such as in a programmable logic device like a field programmable gate array, an integrated circuit, and the like. Additionally, the line between what is hardware and what is software (implemented by hardware such as a processor) has blurred. A field programmable gate array, for instance, is a hardware element that can be configured and potentially reconfigured using a memory (typically called "firmware"), commonly programmed via a hardware description language, to perform different logic functions. A hardware description language (HDL) is a specialized computer language used to program the structure, design and operation of electronic circuits, and thus is potentially akin to "software". Regardless, the node activation/deactivation module 186 may be implemented through some combination of hardware or software implemented via hardware, if desired.

The one or more network interfaces 161 communicate over one or more networks such as the networks 170 and 131. Two or more eNBs 190 communicate using, e.g., network 170. The network 170 may be wired or wireless or both and may implement, e.g., an X2 interface.

The wireless network 100 may include a network control element (NCE) 140 that may include MME/SGW functionality, and which provides connectivity with a further network, such as a telephone network and/or a data communications network (e.g., the Internet). The eNB 190 is coupled via a network 131 to the NCE 140. The network 131 may be implemented as, e.g., an S1 interface. The NCE 140 includes one or more processors 175, one or more memories 171, and one or more network interfaces (N/W I/F(s)) 180, interconnected through one or more buses 185. The one or more memories 171 include computer program code 173.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, sensor nodes that communicate sensor information from one or more sensors 163 to other nodes in a network 100. More specifically, such sensor information is typically communicated to a sink node, which in an example could be outside the cellular network shown in part as network 100. For instance, in FIG. 1, a sink 191 is in or connected to the "other networks/Internet" 192. A sink 191 (which may also be referred to as a sink node) gathers and filters the data (possibly) from multiple sensors nodes. The sensor nodes (110, in these examples) transmit the information to the sink node 191 and then the sink node 191 performs, e.g., intelligent sensor data fusion and, for example, displays the data to an end user. The sink node 191 may be, e.g., the computer of the end user and in that case the information may be transmitted from the sensor nodes to the sink node over the Internet, for example.

Meanwhile, such sensors 163 can include motion sensors, acoustic sensors, vibration sensors, video surveillance equipment such as visible light or infrared light cameras, chemical sensors, optical sensors, light sensors, pressure sensors, environment sensors, weather sensors, moisture sensors, humidity sensors, temperature sensors, heat sensors, and the like. The sensor nodes 110 and the sink node 191 are part of a WSN 187.

Exemplary embodiments herein mainly relate to the exploitation of wireless sensor networks (WSNs) in cellular systems, although the embodiments may be beneficial for other applications. An exemplary focus is on prediction-based applications, where only the necessary sensors/devices are awake for energy saving. This enables waking up other nodes when needed, while keeping the other nodes in a low-power state (i.e., the nodes that are not needed can use long sleeping cycles).

Such prediction-based WSN applications have been gathering a lot of attention in the research community during the past ten years or so. In a basic scenario, a simple sensor node (sensing parameters such as motion/acoustic/vibration) detects a location for a sensed element, such as an intruder (e.g., a human, a deer or a car) or a natural phenomenon, and estimates a trajectory of the sensed element, and then wakes up another simple sensor node. Thus, the exemplary main problems in this case are related to minimization of delay and reliability of packet transmissions and receptions through the cellular link 111, e.g., in uplink.

Although the amount of data may be quite small in the basic scenarios in general, it should be noted that in many cases cluster-based WSNs are exploited to achieve better estimation accuracy, improve power efficiency, and enable centralized communication to a base station and further to a server. In this case, the amount of data could be significant because a cluster-head may activate all the sensors within the cluster, which further means that resource allocation becomes important as well.

Moreover, in case of video surveillance applications, the amount of data is significant, so the resource allocation related problems may be severe. When a first video camera wakes up a second video camera, which starts to transmit a video feed, the amount of required radio resources is suddenly doubled. Since the first video camera (most likely) will stop transmitting quite soon, efficient resource allocation is essential.

Another potential application is intruder detection. If there are simple sensor nodes outside a house that detect an intruder, the nodes could notify and activate video cameras indoors in advance. This enables long sleeping cycles of the video cameras, depending on the speed of the target. Another point is that if a user controls a video camera, it would be beneficial to wake up the next video camera in advance when the intruder is approaching (where the "next" video camera would have a view of the intruder once the intruder leaves the view of the current video camera), so that the user would be able to place the next camera in use quickly.

Several environment monitoring applications may also exploit prediction-based estimation methods. For example, in case of forest fires, volcano eruptions, mud flows, and the like, the first node that senses the event should be able to wake up all the other nodes, or at least many of the nodes in a certain area. This suddenly induces a lot of traffic in the link between the nodes and the cellular/radio access network.

It may be possible that a node in a non-cellular WSN can directly wake up another node in the non-cellular WSN. If not directly, the waking up could be performed by using a multi-hop communication. For waking up a node in a non-cellular WSN, a node could use another communication technology operating on a frequency band, such as IEEE 802.15.4, different from a cellular frequency band. In any case, sensor information has to be transmitted to a sink node so some sort of backhaul connection is typically required, for example, by using a cellular network.

However, in a cellular WSN the use of an additional radio technology is not required. In WSNs operating in a cellular network such as the network 100, the nodes may directly transmit sensor information to the sink node via a base station. But then the problem is how to wake up another node in such a system. One option in case of cellular WSNs is that the base station could allocate a specific resource for direct communication between the sensor nodes (for instance, direct D2D) so that the nodes could exchange information directly, i.e., wake up another node when necessary. But this solution is not good, because the resources would not be available for any other use, even though the allocated resources would be used infrequently by the sensor nodes. Since the base station does not have any information about which nodes will be active and which will be inactivate, the base station cannot allocate resources accordingly.

Moreover, in many scenarios these solutions would require multi-hop communications, which consume extra resources, and more sensors would need to be activated for no purpose other than participating in the multi-hop communication. Additionally in some cases, it would be beneficial to activate many sensor nodes at the same time. With the existing methods, this would require a lot of signaling and multi-hop communications.

Exemplary embodiments herein can improve on these scenarios, e.g., by involving a base station (such as eNB 190, which is an LTE base station, or base stations for other wireless systems) in the process. The exemplary embodiments could also have potential in case of ultra-reliable communications, which is discussed in METIS as one of the 5G enablers. The METIS 5G project strongly emphasizes the importance of the reliability in communications: "Despite the large proliferation within the last two decades, commercial wireless and mobile technologies have not attained the level of commodity comparable to e.g., electricity. The reason is that the commercial wireless technologies are designed to offer relatively good connectivity most of the time, but offer almost zero data rate in areas with poor coverage, under excessive interference or in a situation in which the network resources are overloaded. On the other hand, wireless technology continues to enter into new areas of use and an increasing number of services will start to depend critically on the availability of wireless link that offers certain communication quality, in terms of rate, delay, or another Quality-of-Service (QoS) parameter. The range of services that rely on minimal allowable wireless connectivity spreads a wide range, illustrated through the following examples:

- Cloud-computing services with defined minimal latency and rate;
- Large-scale distributed cyber-physical systems for e.g., industrial control;
- Interconnected vehicles, communication between vehicles and the road infrastructure as well as the subjects proximate to the road;
- Minimal communication requirements under emergency scenarios, such as minimal number of bytes that a wireless user/device is capable to send within a certain time frame."

The proposed exemplary embodiments can be used in all of the above scenarios, and probably in many other scenarios as well, to minimize latency, improve reliability and enable efficient, proactive resource allocation.

An exemplary proposal herein is that the base station is involved in the process. It should be noted that although a base station is used herein in an example, potentially other elements of a network 100 could be involved. In short for the exemplary proposal, a source node (e.g., a first node) identifies at least one other node (e.g., a second node) that will be or needs to be activated in the near future. The source node (e.g., first node) transmits an indication to a base station to indicate that the at least one other node (e.g., the second node) will be activated (or should be activated) in the near future. In this disclosure, the first node is referred to as the source node and the other node(s) that are to be activated is/are referred to as target node(s). The source node may send indication(s) of resources for the target node(s) to the base station. The base station can then prepare resources in advance for the target node(s) and activate the target node(s) if needed. Because the source node may send indication(s) of resources for the target node(s) to the base station, this may be thought of as proactive radio resource management (RRM), as the source node is actively requesting RRM for target node(s).

Figure 2:
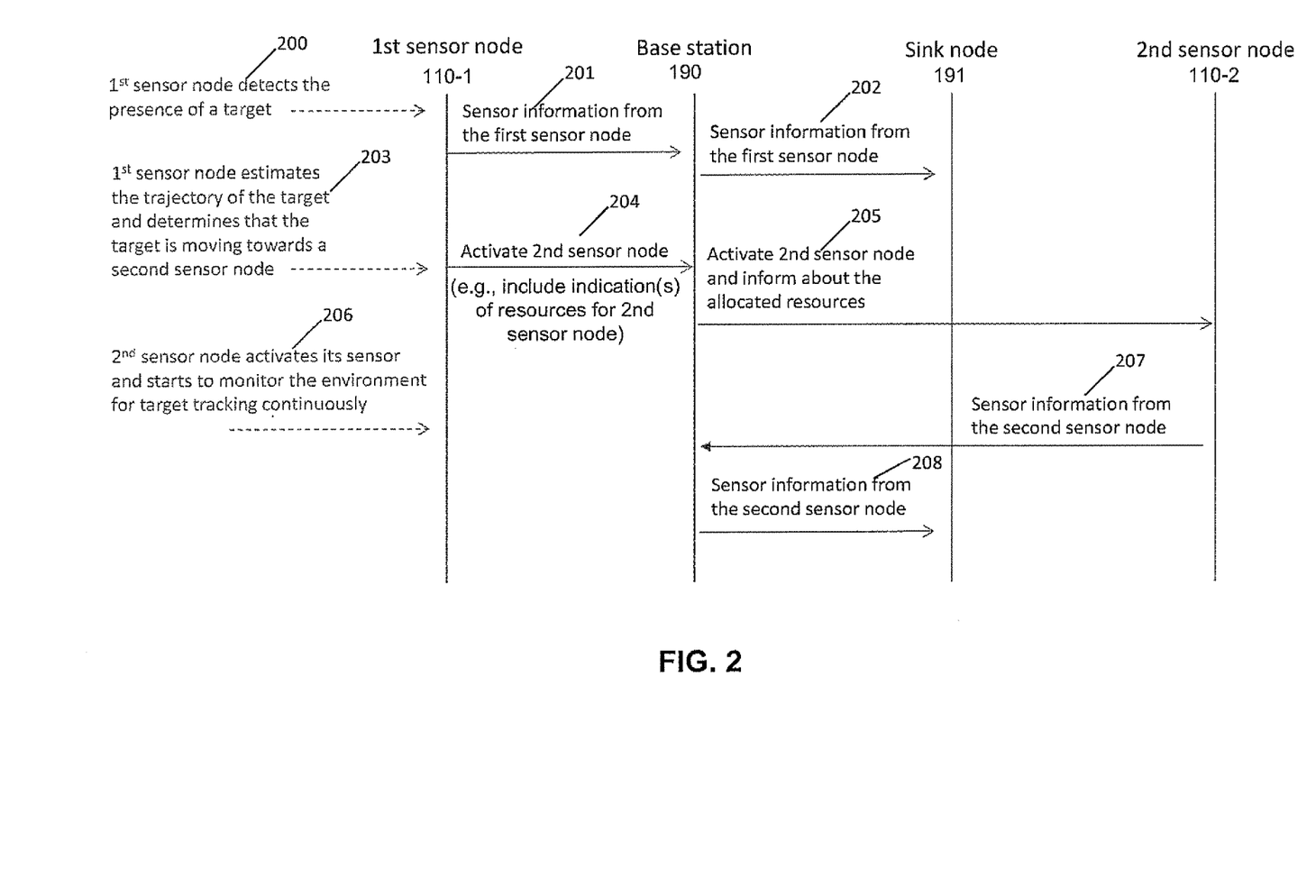
FIG. 2 is a signaling diagram illustrating an exemplary embodiment.

FIG. 2 provides an overview of operations performed in a WSN such as the one illustrated in FIG. 1 and is a signaling diagram illustrating an exemplary embodiment. The first (1st) sensor node 110-1, base station 190, sink node 191, and second (2nd) sensor node 110-1 are shown in FIG. 2. The first sensor node 110-1 is also described herein as a source node, and the second sensor node 110-2 is also described herein as a target node. The first sensor node 110-1, in operation 200, detects the presence of a sensed element and sends sensor information (operation 201) from the first sensor node to the base station 190. The base station 190 then forwards (operation 202) the sensor information from the first sensor node to the sink node 191.

In operation 203, the sensor node 110-1 estimates the trajectory of the target and determines that the target is moving towards a second sensor node 110-2. Consequently, in operation 204, the first sensor node 110-1 sends a message (operation 204) to the base station 190 to activate the second sensor node. The message may include indication(s) of resources for the second sensor node 110-2 (e.g., or other messages may be used to indicate the resources). The base station 190, in operation 205, activates (e.g., via a message) the second sensor node 110-2 and informs the second sensor node 110-2 about resources allocated by the base station for the second sensor node 110-2.

In operation 206, the second sensor node 110-2 activates its sensor and starts to monitor continuously the environment for target tracking. In operation 207, the second sensor node 110-2 sends sensor information from the second sensor node 110-2 to the base station 190. In operation 208, the base station 208 forwards the sensor information from the second sensor node 110-2 to the sink node 191.

Figure 3:
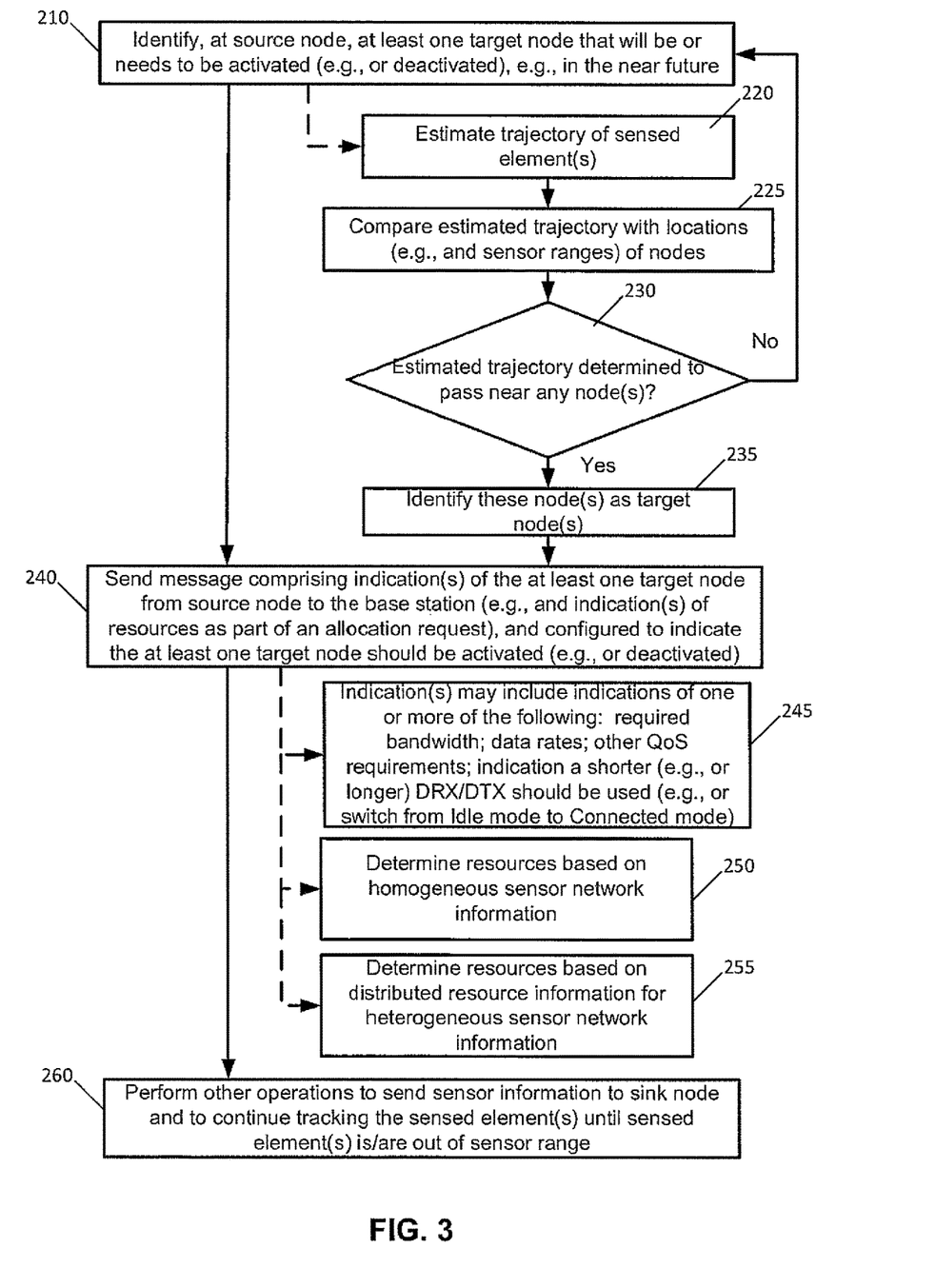
FIG. 3 is a block diagram of an exemplary logic flow diagram for activating and deactivating nodes in a network performed by a user equipment, and that illustrates the operation of an exemplary method, a result of execution of computer program instructions embodied on a computer readable memory, and/or functions performed by logic implemented in hardware, in accordance with exemplary embodiments herein.

FIG. 3 describes these techniques in more detail from the point of view of the first sensor node 110-1. Meanwhile, FIG. 5 describes these techniques in more detail from the point of view of the base station 190.

Turning to FIG. 3, a block diagram is shown of an exemplary logic flow diagram for activating and deactivating nodes in a network performed by a user equipment 110-1, e.g., under control of the node activation/deactivation module 145-1. This figure also illustrates the operation of an exemplary method, a result of execution of computer program instructions embodied on a computer readable memory, and/or functions performed by logic implemented in hardware, in accordance with exemplary embodiments herein. It should be noted that the blocks in FIG. 3 may be considered to be interconnected means for performing the functions in the blocks.

At the source node, which is assumed to be UE 110-1 in this example, the at least one target node (e.g., UE 110-2) that will be or needs to be activated in the near future can be identified (block 210). The locations of nodes should be distributed for the identification and estimation of trajectory to occur, but this is not a major issue, because this can be performed, e.g., only once during the setup. This is especially true since usually there typically are no mobile nodes in these applications, where "mobile" means the mobile node can physically move. In any case, locations should be known by the UE 110-1 and the node activation/deactivation module 145-1.

The identification of target node(s) (e.g., UE 110-2) may be based on the estimated trajectory of the sensed element for example. An example of identifying target nodes based on trajectory of a sensed element is illustrated in FIG. 3 by blocks 220-235. It should be clarified that there is no communication between the source node and the sensed element. Instead, in wireless sensor networks the sensor nodes (110 in these examples) monitor physical or environmental conditions such as temperature, sound, pressure. The sensor nodes 110 thus do not have any way to communicate with the sensed element (i.e., the sensed element is not another UE for example).

Figure 4:
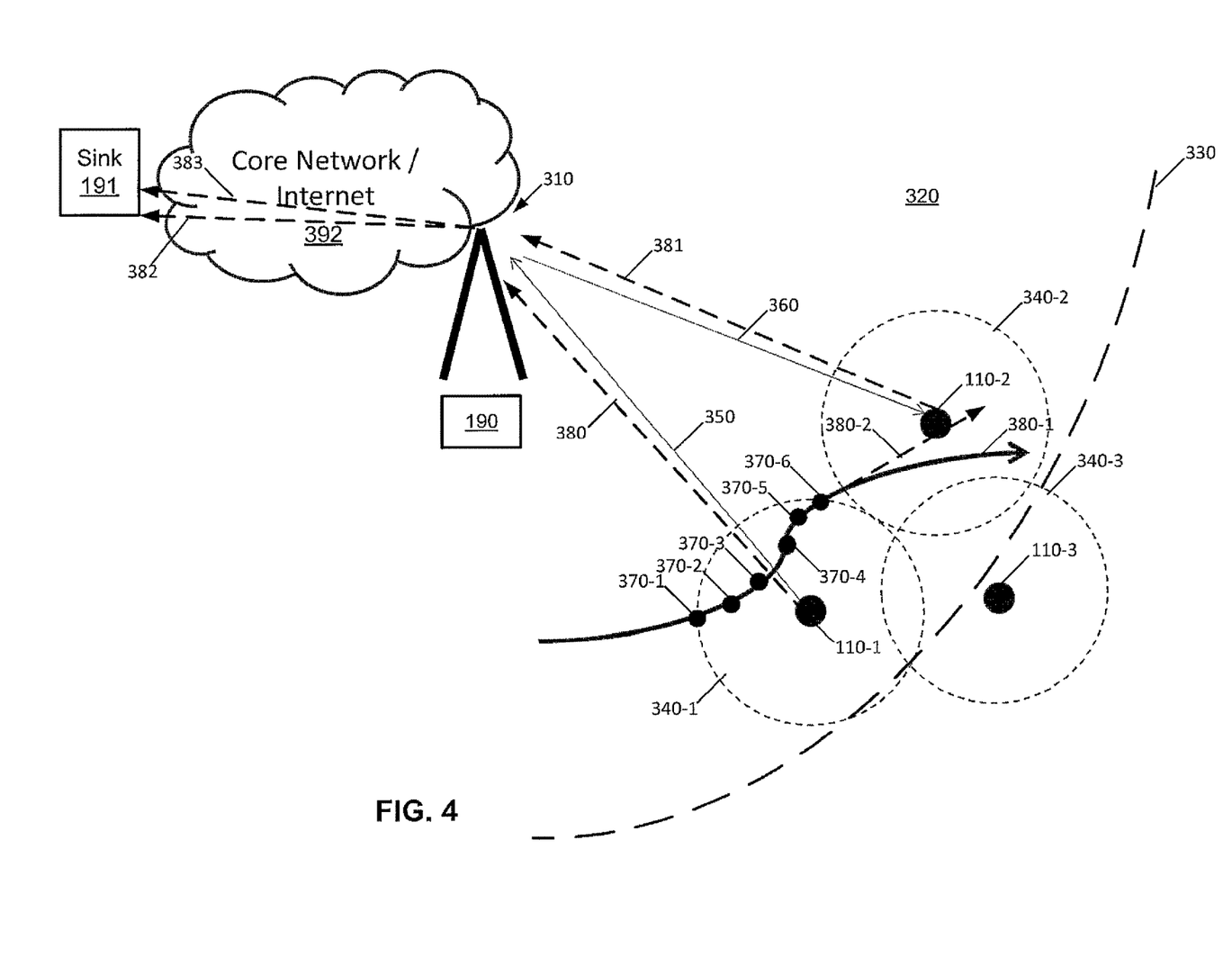
FIG. 4 is an illustration of calculating a trajectory of a sensed element in accordance with an exemplary embodiment.

In block 220, the UE 110-1 estimates a trajectory of sensed element(s). For instance, the sensed element could be an intruder, which in FIG. 4 is illustrated as being in (or being represented by) locations 370-1 through 370-6 (note that the locations 370 may also be considered to be a sensed element 370, since the sensed element is assumed to be at those corresponding locations). The sensed element may be anything else that can be sensed by a sensor network, such as a tornado, water flow, mud flow, and the like. An eNB 190 is connected to a radio tower 310 and the eNB 190 forms one or more cells 320 having an edge 330. The UE 110-1 communicates in uplink with the eNB 190 via link 350 (e.g., shown in FIG. 1 as 111-1), and the eNB 190 communicates in downlink with the UE 110-2 via link 360 (shown in FIG. 1 as 111-2). Both the source node, UE 110-1, and the target node, UE 110-2, send sensor information to the eNB 190, as illustrated by references 380 and 381, respectively. The eNB 190 forwards, as illustrated by references 382 and 383, the sensor information from the source and target nodes, respectively, to the sink 191, e.g., via a core network and possibly the Internet 392. The sink 191 is shown outside the core network/internet 392, but this is merely exemplary, and the sink 191 may be within, e.g., the Internet.

In this example, both the source node, UE 110-1, and the target node, UE 110-2, are within a cell 320 formed by a single eNB 190, but this may not be the case generally. In fact, a possible target node, UE 110-3, is shown outside of the cell 320. Each of the nodes, UEs 110-1, 110-2, and 110-3, is assumed to have some corresponding sensor range 340-1, 340-2, or 340-3, respectively. The UE 110-1 includes a sensor or sensors 163 that can determine an intruder is in an approximate locations 370-1 through 370-6, where location 370-1 occurs in time before location 370-2, which occurs in time before location 370-3, and the like, such that location 370-6 occurs latest in time. Based on the locations 370, the UE 110-1 can determine what the estimated trajectory 380 is. In this case, the estimated trajectory 380-1 might be determined based on a curve-fitting algorithm, whereas estimated trajectory 380-2 might be determined based on a simple line drawn using locations 370-5 and 370-6. Any technique for determining an estimated trajectory of a sensed element may be used in block 220.

In block 225, the UE 110-1 compares the estimated trajectory 380 with locations (e.g., and ranges) of nodes. In block 230, the UE 110-1 determines whether the estimated trajectory is determined to pass near any node(s). For instance, a predetermined distance (e.g., based on a range of sensing provided by the sensor 163 in the UE 110-2) could be used to determine determines whether the estimated trajectory is determined to pass near (e.g., within some predetermined distance from) the node that is UE 110-2. In another example, the UE 110-1 could determine that, based on the trajectory 380, it is more probable than not the intruder would enter the sensor range 340-2 of the UE 110-2. In a further example, the UE 110-1 could determine that, based on the trajectory 380, it is possible for the intruder to enter the sensor range 340-2 of the UE 110-2. Note that the source node, UE 110-1, could also select UE 110-3 as a target node. If this is the case, the eNB 190 could communicate with another eNB (not shown in FIG. 4) forming a cell (also not shown in FIG. 4) in which the UE 110-3 resides, in order to communicate information from the source node to active the target node, UE 110-3.

If it is determined by the UE 110-1 that the estimated trajectory will pass near any node(s) such as the node of UE 110-2 (block 230=Yes), in block 235, the source node, UE 110-1, identifies these node(s) as target node(s) and the flow proceeds to block 240. If it is determined by the UE 110-1 that the estimated trajectory will not pass near any node(s) such as the node of UE 110-2 (block 230=No), the flow proceeds back to block 210.

It is noted that in block 210, multiple target nodes can be identified as well. In addition, the source node can be a cluster-head which identifies that another cluster-head will be activated. The source node may be a motion/acoustic/vibration sensor or video camera, and the like.

In block 240, the UE 110-1 sends message comprising indication(s) of the at least one target node from source node to the base station. Note that multiple messages may also be used if desired. The message is also configured to indicate to the base station that the at least one target node should be activated (e.g., or deactivated as described below). The configuring could be via a particular message defined to activate target cell(s) or by an indication (such as a bit, an Information Element, a part of an Information Element, or the like) configured to inform the base station that the at least one target node should be activated. The sending of the message is also illustrated by link 350 of FIG. 4. This sending may also include sending indication(s) of resources, e.g., as part of an allocation request. The indication may include (see block 245), e.g., indications of required bandwidth, data rates or other QoS requirements such as the minimal delay/latency. These items may be used for resource allocation for the target node and for the target node to communicate (e.g., sensor information) with the eNB 190. In addition, the source node may indicate (via one or more indications) that a shorter DRX/DTX (that is, one or both of a shorter DRX or a shorter DTX) should be used for the other node (e.g., to enable faster control or longer sleeping cycles).

In the case of homogeneous sensor networks, it is enough to distribute the locations of the nodes because a node already knows that other nodes in the sensor network have the same resource need. Thus, in block 250, the source node, UE 110-1, can determine resources to request for the target node, UE 110-2, based on homogeneous sensor network information. However, in case of heterogeneous networks, nodes should distribute their resource needs (or type of a device, e.g., acoustic sensor or a video camera, from which their resource needs could be determined) along with the location information so that a source node can request appropriate resources for a target node. Consequently, in block 255, the UE 110-1 can determine resources to request for the target node, UE 110-2, based on distributed resource information for heterogeneous sensor network information.

In block 260, the source node, UE 110-1, performs other operations to send sensor information to the sink node 191 and to continue tracking the sensed element(s) until the sensed element(s) is/are out of sensor range 340. It is noted that an end result is that the source node stops target tracking once the target leaves its area, illustrated in FIG. 4 as a sensor range 340. The target node wakes up and starts to monitor the environment once the target node receives an indication from the base station. As indicated in FIG. 2, the target node (shown as a second sensor node) also starts to transmit sensor information to the sink 191 after detecting the presence (and location) of the sensed element.

Figure 5:
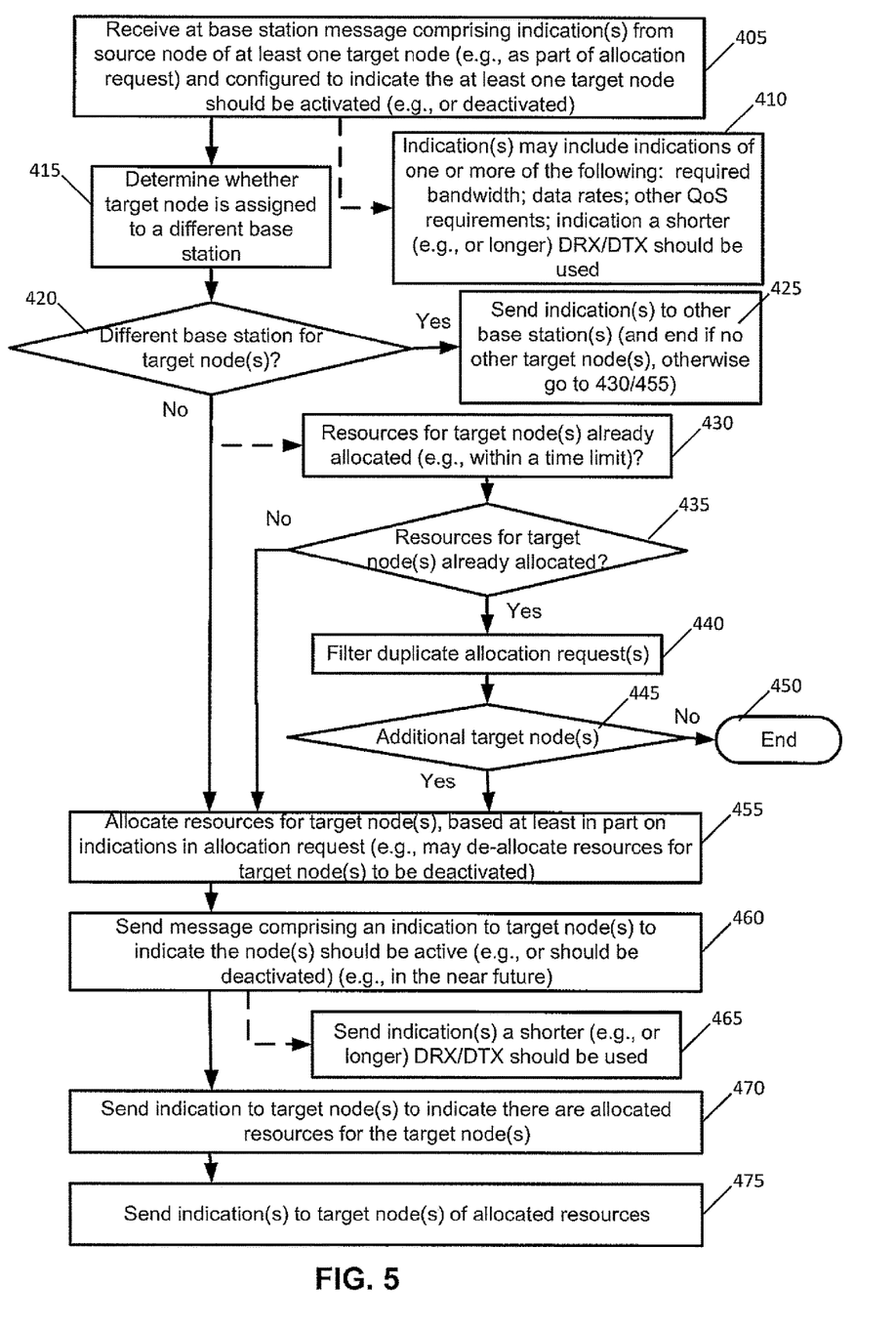
FIG. 5 is a block diagram of an exemplary logic flow diagram for activating and deactivating nodes in a network performed by a base station, and that illustrates the operation of an exemplary method, a result of execution of computer program instructions embodied on a computer readable memory, and/or functions performed by logic implemented in hardware, in accordance with exemplary embodiments herein.

Referring to FIG. 5, this figure is a block diagram of an exemplary logic flow diagram for activating and deactivating nodes in a network performed by a base station such as eNB 190, e.g., under control of the node activation/deactivation module 186. This figure further illustrates the operation of an exemplary method, a result of execution of computer program instructions embodied on a computer readable memory, and/or functions performed by logic implemented in hardware, in accordance with exemplary embodiments herein. It should be noted that the blocks in FIG. 5 may be considered to be interconnected means for performing the functions in the blocks.

In block 405, the eNB 190 receives a message comprising indication(s) from the source node of at least one target node (e.g., as part of allocation request). The message is also configured to indicate the at least one target node should be activated (e.g., or deactivated as described below). An indication could simply be of the target node, such as an ID of the target node. The indications, however, could also include (block 410) indications of one or more of the following: required bandwidth; data rates; other QoS requirements; and/or indication a shorter (or longer) DRX/DTX should be used. For instance, the source node could request the eNB 190 reserve resources for the target node by using, e.g., the required bandwidth; data rates; other QoS requirements for the target node.

As stated above, the indication a shorter DRX/DTX should be used would reduce the length of DRX or DTX cycles. Use of a longer DRX/DTX cycle is described below. At this point, though, it is helpful to relate some information about DRX/DTX cycles and their use herein. Reducing the length of DRX cycles means less sleeping and more active periods within a "fixed" time period. This means the UE will go to sleep and wake up in a short pattern for communication purposes. If new data comes in, the UE can thus be delivered the data quite quickly because the device only sleeps for short periods.

So an exemplary idea herein is that if a base station informs the target sensor node that the target sensor node should use a shorter DRX/DTX, this information implicitly tells the target sensor node that the node needs to activate its sensor(s) and start target tracking (e.g., because something is obviously going to happen). And vice versa, such that increasing the length of the DRX cycles means more sleeping and fewer active periods within the fixed time period and a target sensor node should implicitly determine the node should not need to activate (or can deactivate) its sensor(s).

Actually implicit indication is also possible, which is that if a base station tells to the target sensor node to switch (or that the target sensor node has been switched) from Idle mode to the Connected mode (without the target sensor node asking for this switching), the target sensor node would again determine something is going happen. Hence, the target sensor node could determine to activate its sensor(s) and start target tracking based on that information as well.

Furthermore, a case where the eNB of the source node (i.e., node making the request) and the eNB of the target node (i.e., the node to be activated or deactivated) are not the same is most likely quite seldom, but that should not be a problem anyway because the network can handle the situation when the source node provides at least the ID of the target node (e.g., similar to network controlled or assisted D2D case). The base station can communicate the ID (e.g., and other information such as the required bandwidth; data rates; other QoS requirements for the target node) via a direct interface such as an X2 interface via link 170 or an indirect interface (e.g., via link 131 through an NCE 140 to another eNB). Thus, in block 415, the eNB 190 determines whether the target node is assigned to a different base station. If so (block 420=Yes), in block 425, the eNB 190 sends indication(s) to the other base station. The indication(s) could include the ID of the target node, and any other indication received in block 410. The flow ends in block 425 if there are no other target nodes part of the cell for the eNB 190; otherwise (if there are additional target node(s)), the flow proceeds to 430 or 455.

If there are any target nodes part of the cell for eNB 190 (block 420=No), in some cases, multiple source nodes may ask for resources for a single target node and consequently, the base station would allocate too many resources for the target node. To avoid this problem, the base station can optionally and simply filter out duplicate resource allocation requests for the same that are received, e.g., within a short, predetermined period. Similarly, if a base station knows that the base station has already allocated resources for a particular target node, the base station can ignore a request to allocate resources for the particular target node, because the base station knows that the target node is already active. With this method, source nodes do not need to know whether the target node is already active.

Blocks 430-445 illustrate an example where multiple source nodes may ask for resources for a single target node. These multiple requests for resources for the same target node(s) may be filtered. In block 430, the eNB 190 determines whether resources for target node(s) have already been already allocated (e.g., within a predetermined time limit). If not (block 435=No), which should mean the resources for target node(s) have not already been already allocated (e.g., or any previous allocation is outside the predetermined time limit), the flow proceeds to block 455. If so (block 435=Yes), which should mean the resources for target node(s) have already been already allocated (e.g., within the predetermined time limit), the eNB in block 440 filters duplicate allocation request(s). For instance, the eNB 190 could ignore these duplicate request(s). If there are additional target node(s), e.g., that have not been filtered in block 440 (block 445=Yes), the flow proceeds to block 455, otherwise (block 445=No), the flow ends in block 450.

In block 455, the eNB 190 allocates resources for the target node(s) based in part on indications in the allocation request (if received) from block 405. The resources could be any type of radio resources, which depends on the system being used. In the case of LTE, the resources are most likely time/frequency resources. However, the exemplary embodiments could be used in other systems such as CDMA-based systems as well The eNB 190 in block 460 sends a message or messages (as illustrated also by link 360 of FIG. 4) to the target node to indicate that the target node should be active or will be activated in the near future, and the eNB 190 has already reserved certain resources for the target node (block 470). In addition, the indication in block 460 may comprise, e.g., an indication to use a shorter DRX/DTX cycle (see block 465), which would implicitly inform the target node that a sensed element is approaching.

In block 475, the eNB 190 sends indication(s) to target node(s) of allocated resources. These resources are for communication between the target node and the eNB 190. The indication can simply be an UL grant message as an example.

It should be noted that the target node is not requesting its own resources, but instead the source node that identifies the target node through, e.g., activation prediction algorithms is indicating needed resources between the target node and the base station.

In addition to this, the techniques can be applied in the other way around. For instance, if the target node does not need to be active any longer, the source node may deactivate the target node using the base station and the techniques presented above. In this case, the target node can go into a longer sleep (DTX and/or DRX) cycle or be assigned a smaller number of resource reservations by the base station.

Similarly, there could be also other use cases for the techniques herein as well. If a user has multiple devices or gadgets (e.g., smartphone, tablet, smart watch and wireless sensors), then one node (or multiple nodes) can be deactivated (e.g., obtaining longer DRX/DTX cycles or less resource reservations by a BS/network) while the user is working with another.

Regarding techniques to deactivate one or more target nodes, in FIG. 3, in block 210, the source node, UE 110-1, could identify the one or more target nodes that will or need to be deactivated, e.g., in the near future. In block 240, the source node, UE 110-1, sends a message comprising indication(s) of the at least one target node from the source node to the base station, where the message is configured to indicate the at least one target node should be deactivated. The configuring could be via a particular message defined to deactivate target cell(s) or by an indication (such as a bit, an Information Element, a part of an Information Element, or the like) configured to inform the base station that the at least one target node should be deactivated. There could be separate messages defined for activating target nodes and for deactivating target nodes, or a single message could have an indication that can operate to indicate either target node(s) should be activated or target node(s) should be deactivated. For instance, a single bit could be used to indicate one of activation or deactivation of target nodes. Furthermore, the message in block 240 could include (block 245) an indication a longer DRX/DTX should be used. Also, the message could include an indication to switch from the Idle mode to the Connected mode.

For techniques to deactivate one or more target nodes, blocks 220-235 could be used in the reverse, so that any nodes deemed to be nodes not in the trajectory of the sensed element would be target nodes for deactivation (whereas nodes deemed to be to be nodes in the trajectory of the sensed element would be target nodes for activation). Furthermore, for techniques to deactivate one or more target nodes, blocks 250, 255, and 260 likely would not be used, since the target nodes are to be deactivated and therefore do not need resources and also there should be no further communications between the source node and target nodes that are being deactivated.

Regarding techniques to deactivate one or more target nodes, in FIG. 5, the eNB 190 receives a message comprising indication(s) from the source node of at least one target node, where the message configured to indicate the at least one target node should be deactivated. As described above, the configuring could be via a particular message defined to deactivate target cell(s) or by an indication (such as a bit, an Information Element, a part of an Information Element, or the like) configured to inform the eNB 190 that the at least one target node should be deactivated. There could be separate messages defined for activating target nodes and for deactivating target nodes, or a single message could have an indication that can operate to indicate either target node(s) should be activated or target node(s) should be deactivated. For instance, a single bit could be used to indicate one of activation or deactivation of target nodes. Furthermore, the message in block 405 could include (block 410) an indication a longer DRX/DTX should be used.

It is possible the target node(s) for deactivation could be connected to other base stations, so blocks 415, 420, and 425 can be performed. For those target node(s) not connected to other base stations, in block 455, the resources for the target node(s) to be deactivated can be de-allocated and consequently freed for use by other nodes. In block 460, the eNB 190 sends a message comprising an indication to the target node(s) to indicate the node(s) should be deactivated (e.g., in the near future). Furthermore, the message in block 460 may include (block 465) indication(s) a longer DRX/DTX should be used.

For techniques to deactivate one or more target nodes, blocks 430-450, 470, and 475 likely would not be used.

The following are exemplary embodiments. Example 1. A method, comprising: determining at a source node in a wireless network that at least one target node should be one of activated or deactivated; and sending one or more messages from the source node toward a base station providing wireless access for nodes to the wireless network, wherein the one or more messages comprise an identification of the at least one target node and are configured to indicate that the at least one target node should be one of activated or deactivated. Example 2. The method of example 1, wherein the determining performs determining at the source node that the at least one target node should be activated, and wherein the one or more messages are configured to indicate the at least one target node should be activated. Example 3. The method of example 2, wherein the one or more messages further comprises one or more indications of resources to be used for the at least one target node to communicate at least sensor information with the base station.

Example 4. The method of example 3, wherein the one or more indication of resources comprise one or more of an indication of required bandwidth, one or more indications of one or more data rates, or one or more indications of other quality of service requirements. Example 5. The method of any one of examples 2 to 5, wherein the one or more messages further comprise one or more indications that one of both of a shorter discontinuous reception (DRX) or a shorter discontinuous transmission (DTX) should be used for the at least one target node. Example 6. The method of any one of examples 2 to 5, further comprising determining the resources to be used for the at least one target node to communicate at least sensor information with the base station based on homogeneous sensor network information.

Example 7. The method of any one of examples 2 to 4, further comprising determining the resources to be used for the at least one target node to communicate at least sensor information with the base station based on heterogeneous sensor network information. Example 8. The method of any one of examples 2 to 7, wherein determining that at least one target node should be activated further comprises estimating a trajectory of one or more sensed elements. Example 9. The method of example 8, wherein determining that at least one target node should be activated further comprises comparing the estimated trajectory with locations of sensor nodes. Example 10. The method of example 9, wherein determining that at least one target node should be activated further comprises, in response to the estimated trajectory being determined to pass near certain one or more sensor nodes, identifying the certain one or more sensor nodes as target nodes to be activated.

Example 11. The method of example 1, wherein the determining performs determining at the source node that the at least one target node should be deactivated, and wherein the one or more messages are configured to indicate the at least one target node should be deactivated. Example 12. The method of example 11, wherein determining that the at least one target node should be deactivated further comprises estimating a trajectory of one or more sensed elements, comparing the estimated trajectory with locations of sensor nodes, and, in response to the estimated trajectory being determined to not pass near certain one or more sensor nodes, identifying the certain one or more sensor nodes as target nodes to be deactivated. Example 13. The method of any one of examples 11 to 12, wherein the one or more messages further comprise one or more indications that one of both of a longer discontinuous reception (DRX) or a longer discontinuous transmission (DTX) should be used for a target node.

Example 14. The method of any one of examples 1 to 13, wherein each of the source node and at least one target node comprise one or more of the following sensors: motion sensor, acoustic sensor, vibration sensor, video surveillance equipment, chemical sensor, optical sensor, light sensor, pressure sensor, environment sensor, weather sensor, moisture sensor, humidity sensor, temperature sensor, or heat sensor. Example 15. The method of any one of examples 1 to 14, wherein the sensed element comprises one of an intruder or a natural phenomenon. Example 16. The method of any one of examples 1 to 15, wherein the source and target nodes are sensor nodes in a wireless sensor network.

Example 17. An apparatus, comprising: means for determining at a source node in a wireless network that at least one target node should be one of activated or deactivated; and means for sending one or more messages from the source node toward a base station providing wireless access for nodes to the wireless network, wherein the one or more messages comprise an identification of the at least one target node and are configured to indicate that the at least one target node should be one of activated or deactivated. Example 18. The apparatus of example 17, further comprising means for performing the method of any of examples 2 to 16. Example 19. A user equipment comprising the apparatus of example 17 or example 18.

Example 20. A method, comprising: receiving at a base station one or more messages from a source node, wherein the base station provides wireless access for nodes to a wireless network, wherein the one or more messages comprise an identification of at least one target node and are configured to indicate that the at least one target node should be one of activated or deactivated; and sending a message toward each of the at least one target nodes indicating that the target node should be the one of activated or deactivated.

Example 21. The method of example 20, wherein the one or more messages are configured to indicate the at least one target node should be activated and wherein sending further comprises sending the message toward each of the at least one target node indicating that the target node should be activated. Example 22. The method of example 21, wherein the one or more messages comprise one or more indications of resources to be used for the at least one target node to communicate at least sensor information with the base station. Example 23. The method of example 22, further comprising allocating radio frequency resources based at least in part on the one or more indications of resources, and sending a message comprising an indication of the allocated radio frequency resources to the at least one target node.

Example 24. The method of example 22, wherein the one or more indication of resources comprise one or more of an indication of required bandwidth, one or more indications of one or more data rates, or one or more indications of other quality of service requirements. Example 25. The method of any one of examples 21 to 24, wherein the one or more messages further comprise one or more indications that one of both of a shorter discontinuous reception (DRX) or a shorter discontinuous transmission (DTX) should be used for the at least one target node. Example 26. The method of any one of examples 21 to 24, wherein the one or more messages further comprise an indication to switch from an Idle mode to a Connected mode. Example 27. 27. The method of example 20, wherein the one or more messages are configured to indicate the at least one target node should be deactivated and wherein sending further comprises sending the message toward each of the at least one target node indicating that the target node should be deactivated.

Example 28. The method of example 27, wherein the one or more messages further comprise one or more indications that one of both of a longer discontinuous reception (DRX) or a longer discontinuous transmission (DTX) should be used for a target node and the method comprises sending a message toward the target node comprising the one or more indications that one of both of the longer discontinuous reception (DRX) or the longer discontinuous transmission (DTX) should be used for the target node. Example 29. The method of any one of examples 21 or 27, wherein sending a message toward each of the at least one target nodes further comprises, in response to the at least one target node being assigned to a different base station, sending the message to the different base station for forwarding by the different base station toward the at least one target node. Example 30. The method of any one of examples 21 to 29, wherein the source and target nodes are sensor nodes in a wireless sensor network.

Example 31. An apparatus, comprising: means for receiving at a base station one or more messages from a source node, wherein the base station provides wireless access for nodes to a wireless network, wherein the one or more messages comprise an identification of at least one target node and are configured to indicate that the at least one target node should be one of activated or deactivated; and means for sending a message toward each of the at least one target nodes indicating that the target node should be the one of activated or deactivated. Example 32. The apparatus of example 31, comprising means for performing the method of any of examples 21 to 30. Example 33. A base station comprising the apparatus of example 31 or example 32.

Example 34. A system comprising the apparatus of example 17 or 18 and the apparatus of example 31 or 32.

Example 35. A computer program comprising program code for causing an apparatus to perform a method according to any of examples 1 to 16 or 20 to 30. Example 36. The computer program according to example 35, wherein the computer program is a computer program product comprising a computer-readable medium bearing computer program code embodied therein for use with the apparatus.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory(ies) 125, 155 or other device) that may be any media or means that can contain or store the instructions for use by or in connection with an instruction execution system, apparatus, or device, such as a computer. A computer readable storage medium does not, however, encompass propagating signals.

Embodiments of the present invention may also be implemented in an apparatus comprising at least one processor and at least one memory, which includes computer program code, such that the at least one memory and the computer program code are configured with the at least one processor to cause the apparatus to at least perform, carry out, or control any and all of the various features and functions described herein.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

1st first
2nd second
3 GPP Third generation partnership project
5G Fifth generation
CDMA Code Division Multiple Access
D2D Device to Device
DRX discontinuous reception
DTX discontinuous transmission
eNB evolved NodeB (e.g., LTE base station)
ID identification
IEEE Institute of Electrical and Electronics Engineers
METIS Mobile and wireless communications Enablers for the
Twenty-twenty Information Society
MME Mobility Management Entity
QoS Quality of Service
Rel Release
RRM Radio Resource Management
Rx Reception or Receiver
SGW Serving gateway
Tx Transmission or Transmitter
UE User equipment (e.g., a wireless, mobile device)
WSN Wireless Sensor Network

What is claimed is:

1. A method, comprising:
determining at a source node in a wireless network that at least one target node should be one of activated or deactivated; and
sending one or more messages from the source node toward a base station providing wireless access for nodes to the wireless network, wherein the one or more messages comprise an identification of the at least one target node and are configured to indicate that the at least one target node should be one of activated or deactivated.

2. The method of claim 1, wherein the one or more messages further comprises one or more indications of resources to be used for the at least one target node to communicate at least sensor information with the base station.

3. The method of claim 1, wherein the one or more messages further comprise at least one of one or more indications that one or both of a shorter discontinuous reception (DRX), and a shorter discontinuous transmission (DTX) should be used for the at least one target node, and one or more indications that one or both of a longer discontinuous reception (DRX) and a longer discontinuous transmission (DTX) should be used for a target node.

4. The method of claim 1, further comprising determining the resources to be used for the at least one target node to communicate at least sensor information with the base station based on homogeneous sensor network information or heterogeneous sensor network information.

5. The method of claim 1, wherein determining that at least one target node should be activated further comprises estimating a trajectory of one or more sensed elements.

6. The method of claim 5, wherein determining that at least one target node should be activated further comprises comparing the estimated trajectory with locations of sensor nodes.

7. The method of claim 6, wherein determining that at least one target node should be activated further comprises, in response to the estimated trajectory being determined to pass near certain one or more sensor nodes, identifying the certain one or more sensor nodes as target nodes to be activated.

8. An apparatus comprising: at least one processor, and
at least one memory including computer program code,
the at least one memory and the computer program code configured to, with the at least one processor, cause the apparatus to:
determine at a source node in a wireless network that at least one target node should be one of activated or deactivated; and
send one or more messages from the source node toward a base station providing wireless access for nodes to the wireless network, wherein the one or more messages comprise an identification of the at least one target node and are configured to indicate that the at least one target node should be one of activated or deactivated.

9. The apparatus of claim 8, wherein the one or more messages further comprises one or more indications of resources to be used for the at least one target node to communicate at least sensor information with the base station.

10. The apparatus of claim 8, wherein the one or more messages further comprise at least one of one or more indications that one or both of a shorter discontinuous reception (DRX), and a shorter discontinuous transmission (DTX) should be used for the at least one target node, and one or more indications that one or both of a longer discontinuous reception (DRX) and a longer discontinuous transmission (DTX) should be used for a target node.

11. The apparatus of claim 8, further configured to determine the resources to be used for the at least one target node to communicate at least sensor information with the base station based on homogeneous sensor network information or heterogeneous sensor network information.

12. The apparatus of claim 8, further configured to determine that at least one target node should be activated based on estimating a trajectory of one or more sensed elements.

13. The apparatus of claim 12, further configured to determine that at least one target node should be activated based on comparing the estimated trajectory with locations of sensor nodes.

14. An apparatus, comprising: at least one processor, and at least one memory including computer program code, the at least one memory and the computer program code configured to, with the at least one processor, cause the apparatus to at least:
receive at a base station one or more messages from a source node, wherein the base station provides wireless access for nodes to a wireless network, wherein the one or more messages comprise an identification of at least one target node and are configured to indicate that the at least one target node should be one of activated or deactivated; and
send a message toward each of the at least one target nodes indicating that the target node should be the one of activated or deactivated.

15. The apparatus of claim 14, wherein the one or more messages comprise one or more indications of resources to be used for the at least one target node to communicate at least sensor information with the base station.

16. The apparatus of claim 15, further configured to allocate radio frequency resources based at least in part on the one or more indications of resources, and send a message comprising an indication of the allocated radio frequency resources to the at least one target node.

17. The apparatus of claim 15, wherein the one or more indication of resources comprise one or more of an indication of required bandwidth, one or more indications of one or more data rates, or one or more indications of other quality of service requirements.

18. The apparatus of claim 14, wherein the one or more messages further comprise one or more indications that one or both of a shorter discontinuous reception (DRX), and a shorter discontinuous transmission (DTX) should be used for the at least one target node.

19. The apparatus of claim 14, wherein the one or more messages further comprise an indication to switch from an Idle mode to a Connected mode.

20. The apparatus of claim 14, wherein the one or more messages further comprise at least one of one or more indications that one or both of a longer discontinuous reception (DRX) and a longer discontinuous transmission (DTX) should be used for a target node, and the one or more indications that one or both of the longer discontinuous reception (DRX) and the longer discontinuous transmission (DTX) should be used for the target node.

* * * * *